United States Patent [19]

Ramshaw et al.

[11] 4,283,255
[45] Aug. 11, 1981

[54] MASS TRANSFER PROCESS

[75] Inventors: Colin Ramshaw; Roger H. Mallinson, both of Runcorn, England

[73] Assignee: Imperial Chemical Industries Limited, London, England

[21] Appl. No.: 963,886

[22] Filed: Nov. 27, 1978

[30] Foreign Application Priority Data

Dec. 1, 1977 [GB] United Kingdom ............... 50072/77

[51] Int. Cl.$^3$ ............................................. B01D 3/30
[52] U.S. Cl. ....................................... 203/49; 203/86; 159/6 R; 261/89; 261/88; 422/270; 202/238
[58] Field of Search ...................... 261/89; 203/98, 49, 203/86; 422/209, 269–272; 159/6

[56] References Cited

U.S. PATENT DOCUMENTS

| | | | |
|---|---|---|---|
| 2,036,924 | 4/1936 | Coutor | 422/270 |
| 2,176,982 | 10/1939 | Thayer | 422/270 |
| 2,941,872 | 6/1960 | Pilo et al. | 261/89 |
| 3,151,043 | 9/1964 | Beattie et al. | 261/89 |
| 3,595,298 | 7/1971 | Enders | 202/238 |

FOREIGN PATENT DOCUMENTS

| | | |
|---|---|---|
| 193260 | 11/1905 | Fed. Rep. of Germany . |
| 1028535 | 4/1958 | Fed. Rep. of Germany . |
| 757149 | 9/1956 | United Kingdom . |
| 858691 | 1/1961 | United Kingdom . |
| 1089378 | 11/1967 | United Kingdom . |
| 1366312 | 9/1974 | United Kingdom . |

OTHER PUBLICATIONS

Influence of Gravitational Force on Gas Absorption in a Packed Column, Vivian et al., A. I. Ch. E Journal, pp. 1088–1091, Nov. 1965.
A. I. Ch. E. Journal, vol. 10, No. 2, p. 223, Vivian, J. E. et al., Mar. 1964.
Centrifugal Vapour-Liquid Contacting, Todd and Maclean, in Equipment Development, Nov. 1969, vol. 14, No. 11, pp. 1565–1568.
Characteristics of a Podbielniak Centrifugal Extractor, Berson and Beyer, Chemical Engineering Progress, v. 49, #5, pp. 243–252, May 53.
A New Centrifugal Gaswasher, Dahlbeck, 8th International Gas Conference Stockholm 1961.

*Primary Examiner*—Norman Yudkoff
*Attorney, Agent, or Firm*—Cushman, Darby & Cushman

[57] ABSTRACT

A process and apparatus are disclosed for effecting mass transfer between two fluid phases, one of which is a liquid. The process comprises charging the fluids to an element which has a large interfacial area and which is permeable to the fluids and rotating the element such that the fluids are subjected to an acceleration of at least 300 m sec$^{-1}$ as they flow through the element.

13 Claims, 4 Drawing Figures

MASS TRANSFER PROCESS

This invention relates to a process for effecting mass transfer between two phases, one of which is a liquid and to apparatus for use in such a process.

By "mass transfer" we mean transfer to a first fluid phase, which is a liquid, from a second fluid phase which is immiscible with the first fluid phase, or vice versa, of at least a proportion of a substance which is a solute for the liquid. Absorption and distillation, process which are widely used in the chemical and petrochemical industries, are typical mass transfer processes. Where a mass transfer process involves transfer of a solute from a liquid to a gas, or vice versa, the process may be "gas-film controlled", or "liquid-film controlled". In "gas-film controlled" mass transfer processes, e.g. the absorption of ammonia into water from an ammonia/air mixture, the rate of mass transfer is limited predominantly by diffusion of the solute through the gas phase. In "liquid-film controlled" mass transfer processes, e.g. the absorption of oxygen into water from air, the rate of mass transfer is limited predominantly by diffusion of the solute through the liquid phase. Where a mass transfer process involves transfer of a solute from a first liquid to a second liquid the process is "liquid-film controlled" and the rate of mass transfer is limited predominantly by diffusion of the solute through one of the liquids.

Rates of mass transfer are conveniently expressed as mass transfer coefficients. For gas-film controlled and liquid-film controlled mass transfer processes they are designated $K_G$ and $K_L$ respectively.

It is known that $K_L$ may be increased by subjecting the fluids to an acceleration of up to approximately 60 m sec$^{-2}$ during the mass transfer process. However, we have now found that on subjecting the fluids during mass transfer to higher accelerations, $K_L$'s are obtained which are greater than those predictable from known work. Moreover, we have also found that $K_G$'s may be increased by subjecting the fluids to a high acceleration during the mass transfer process.

Accordingly, the present invention provides a process for effecting mass transfer between two fluid phases, the first of which is a liquid, which process comprises charging the said fluids to an element which has a large interfacial area and which is permeable to the fluids (hereinafter permeable element) rotating the permeable element about an axis such that the fluids flow through the pores of the permeable element and the first fluid flows radially outwards away from the said axis, and collecting at least a proportion of one of the fluids discharged from the permeable element characterised in that the speed of rotation of the permeable element is such that the fluids are subjected to a mean acceleration of at least 300 m sec$^{-2}$.

Mean acceleration $a_m$ is defined by the equation:

$$a_m = \left(2\pi \frac{N}{60}\right)^2 \left(\frac{r_o^2 + r_1^2}{2}\right)^{\frac{1}{2}}$$

where N is the rotational speed of the permeable element about the said axis in revolutions per minute, $r_o$ is the distance from the axis of the radially inner proportion of the permeable element, and $r_1$ is the distance from the axis of the radially outer proportion of the permeable element.

By "fluid" we mean a substance or a mixture of substances, which is a gas or a liquid at the conditions of temperature and pressure at which the process of the invention is operated. For example, where the second fluid is a gas it may be one gas or a mixture of gases; the first fluid and/or the second fluid (where it is a liquid) may be a neat liquid or may be a solution of one or more solutes in the liquid, which solute may be a gas, liquid or solid.

The permeable element may be an integral whole or a plurality of discrete components. Where the permeable element is an integral whole it may be formed with pores, e.g. cast as a block with pores; or have pores formed therein, e.g. cast as a solid block and pores drilled therein; to be arranged to form pores between the parts thereof, e.g. a coil wire. Where the permeable element comprises a plurality of discrete components, the individual components may be permeable, e.g. open-ended glass tubes, in which case a proportion of the pores are through the components and a proportion of the pores are between the components; preferably however, the individual components are non-permeable and particularly preferably they are non-permeable particles, e.g. glass or metal spheres, in which case the pores of the permeable element are between the components thereof. It is often preferred that the permeable element is an integral whole and is mechanically self-supporting.

The permeable element may be formed from any material which has the mechanical strength to withstand the stress generated in the material during rotation of the permeable element at the rotational speeds employed. Preferably the material is resistant to attack by or reaction with the fluids with which it may be in physical contact. Typically, the material from which the permeable element is formed is a glass, a plastic, e.g. a silicone resin or polytetrafluoroethylene, or a chemically resistant metal, e.g. stainless steel, nickel, titanium or tantalum. Alternatively the material may be a composite of two or more materials in an appropriate disposition. For example, it may comprise a corrosion resistant coating, e.g. of glass or plastic, on a corrodible support, e.g. corrodible metal spheres.

While the permeable element is conveniently homogeneous we do not exclude the possibility that the permeable element may be a composite. For example, an annulus of glass beads may be surrounded by an annulus of wire mesh which may be surrounded by a random mat of polytetrafluorethylene fibres.

It will be appreciated that where the permeable element is not mechanically self-supporting, e.g. it comprises an integral whole arranged to form pores between the parts thereof, or a plurality of discrete components, or is a composite, means to retain the permeable element in a desired shape and to maintain its permeability are often necessary. The said means is preferably in the form of a member which is rotatable about the same axis as the permeable element (hereinafter "rotatable member") and in which the permeable element is disposed. Moreover, where the permeable element is mechanically self-supporting it is often preferably disposed in a rotatable member.

By "interfacial area" we mean the surface area of the permeable element which the fluid may contact per unit volume of permeable element. By large interfacial area we mean an interfacial area of at least 200 m$^{-1}$, preferably more than 1500 m$^{-1}$ and more preferably more than 3000 m$^{-1}$.

While the permeable element may have straight pores, e.g. it may comprise aligned glass tubes or a metal block with channels drilled therein, preferably it has tortuous pores through which the fluid flows, e.g. sold under the trademark it may be a coil of woven type, a sintered mass, knitted or woven wire cloth, a crumpled mesh, skeleton foam, e.g. "Retimet", a random mat of fibres, or a mass of fibres or of particles. Where particles are employed they may all have the same size and shape, or the sizes and/or shapes may be random, or the size and/or shape may be ordered. Particles which may be employed include inter alia particles sold under the trademark, Intalox saddles, ceramic chips, wire gauze pieces, or glass beads. Preferably the particles, where they are employed, have a regular shape and a uniform size, particularly preferably they are glass beads, more particularly preferably glass beads having a diameter within the range 0.5 mm to 2 mm.

The permeable element preferably has a plane of symmetry in which the axis of rotation lies, e.g. it may be in the form of a permeable rod which is rotated about an axis perpendicular to the axis of the rod and distant the mid-point thereof. Particularly preferably the permeable element has a plurality of planes of symmetry which intersect at a line co-incident with the axis of rotation, e g. it may be in the form of a permeable rod which is rotated about an axis perpendicular to the axis of the rod and co-incident with the mid-point thereof. More particularly preferably the permeable element has an axis of symmetry which co-incides with the axis of rotation, e.g. the permeable element may be in the form of an annulus which is rotated about its axis of symmetry. Where the permeable element is in the form of an annulus the outer diameter of the annulus is typically in the range 25 cm to 5 meters, and the inner diameter is typically in the range 5 cm to 20 cm.

While the axis of rotation may be horizontal or vertical or at any angle between, it is often convenient to have the axis vertical. Where a permeable element in the form of an annulus is employed, typically rotary movement is applied to it by a shaft projecting from the plane of the annulus along the axis thereof, (e.g. from the top and/or bottom if the axis is vertical). The permeable element may be rotated by, for example, a variable speed fluid drive, a pulley which may be driven by a belt from an electric motor, or by turbo-propulsion.

As the interfacial area for any particular permeable element is increased, the pressure drop across the permeable element increases and the possibility of fouling and flooding of the permeable element increases. Simple experiment will readily reveal a suitable permeable element for any desired speed of rotation and fluid combination.

Where a rotatable member is employed, the permeable element may be disposed throughout or in a proportion of the rotatable member. The size of the permeable element and its disposition in the rotatable member may be determined by the density and the interfacial area of the permeable element and by the flow characteristics of the fluids. Where the permeable element is disposed in a proportion of the rotatable member it is often preferred that the permeable element is disposed in a radially outer proportion of the rotatable member since as the distance from the axis increases the magnitude of the centrifugal forces which operate on the fluid to form a layer increases and hence the thickness of the layer is decreased. Where the permeable element is disposed in a rotatable member which has an axis of symmetry co-incident with the axis of rotation, the permeable element is preferably distributed symmetrically around the axis so that the rotatable member is dynamically balanced when it is rotated.

The rotatable member, where it is employed, may be constructed of any material which has (a) the mechanical strength to withstand the stress generated in the material during rotation of the rotatable member at the rotational speeds employed and (b) and corrosion resistance to tolerate the environments with which the rotatable member may be in contact during use. Typical materials from which the rotatable member may be constructed include inter alia stainless steel, mild steel, brass, aluminum, nickel, Monel. Choice of a suitable material will present no problem to those skilled in the art.

In general, the speed of rotation will be in the range 50 rpm to 10,000 rpm, preferably in the range 100 rpm to 5,000 rpm and particularly preferably in the range 500 rpm to 2000 rpm.

The speed at which the permeable element is rotated will depend inter alia on its porosity, the throughput of fluids required and the radial distance over which the fluids flow in the permeable element. The minimum speed at which the permeable element is rotated is often determined by the flow characteristics of the fluid. The maximum speed at which the permeable element may be rotated is governed by the mechanical strength of the permeable element, and where it is employed, by the mechanical strength of the rotatable member. Where a rotatable member is employed and where it is in the form of a hollow stainless steel disc in which the permeable element is disposed, typical rotation speeds are; for a disc of 0.5 meters diameter, 1000–3000 rpm; for a disc of 1 meter diameter, 500–2000 rpm; for a disc of 1.5 meters diameter, 400–1000 rpm. As the speed of rotation increases the thickness of the layer of liquid on the walls of the pores of the permeable element at a fixed distance from the axis of rotation decreases.

The mean acceleration as hereinbefore defined, to which the fluid are subjected is preferably greater than 1000 sec$^{-2}$ and particularly preferably greater than 10000 m sec$^{-2}$. For a desired mean acceleration and a desired radial distance over which the fluids flow in a permeable element, the speed of rotation of the permeable element may be readily calculated.

The design of bearings for the rotatable member may be those well known in the engineering art, e.g. radial and thrust bearings of conventional design.

The direction of flow of the second fluid in the process according to the present invention will depend on the relative densities of the two fluids and on their flow rates. Co-current or counter current flow may be operated; increasing the speed of rotation of the permeable element often facilitates counter current flow; increasing the flow rate of the first fluid often facilitates co-current flow. Counter current flow is often preferred.

Where counter current flow is employed it will be appreciated that means are necessary distant the axis of rotation and preferably adjacent the radially outer perimeter of the permeable element to charge the permeable element with the second fluid. Preferably the permeable element is supported in a rotatable member to form a space between the radially outer perimeter of the permeable element and the inner surface of the rotatable member into which space the first fluid flows to form a liquid seal through which the second fluid may be charged to the permeable element. Where the second fluid is a mixture of components they may be delivered to the said space through the same or separate delivery means which are conveniently radially directed channels in the base of the rotatable element.

Where the permeable element is supported in a rotatable member, means to deliver the first fluid to the permeable element typically comprises an orifice in the rotatable member through which the fluid may flow. Where the rotatable member is a hollow disc the delivery means is conveniently axially disposed, although we do not exclude the possibility that it may be located intermediate the axis of rotation and the perimeter of the rotatable member distant the axis of rotation. Where the first fluid is a mixture of components, these may be delivered to the permeable element through the same or separate delivery means, e.g. they may be delivered through concentric tubes.

Where a permeable element supported in a rotatable member is employed in the process according to the invention, means to discharge the first fluid from the rotatable member typically comprises an orifice in the periphery of the rotatable member distant from the axis of rotation, through which orifice the fluid may issue as a spray. Where the rotatable member is a hollow disc in which an annuler permeable element is disposed the orifice is conveniently in the form of a circumferentially extending slit in the wall of the hollow disc and the slit is preferably continuous.

Conveniently, a stationary fluid-collecting means is provided, eg a housing, surrounds the permeable element, or, where a rotatable member is employed, surrounds the rotatable member, in which fluid collecting means the fluids or components or derivatives thereof which are discharged from the permeable element may be collected. It will be appreciated that where counter current flow is occurring the permeable element and the rotatable member where it is employed, will be mounted in the fluid collecting means such that the fluids discharged from the porous element do not mix. Alternatively the permeable element or the rotatable member where it is employed, is provided with a circumferentially extending channel into which the first fluid flows. One or more suitably disposed stationary collecting means, e.g. a fan-tail scoop, dip into the channel and the rotational speed of the first fluid forces it through the collecting means to a suitable location.

The residence time of the fluids within the permeable element is a function of the radial dimensions of the permeable element, the nature and permeability of the permeable element, the rotational speed, and the flow rate of the fluids. These parameters interact with each other and affect the residence time. For example, where the radius is increased and the other parameters kept constant the residance time is increased; where the flow rate is increased and the other parameters kept constant the residence time is reduced; where the rotational speed is increased and the other parameters kept constant the residence time is reduced.

It will be appreciated that for the generation of a liquid surface of large area, the first fluid and/or the second fluid where it is a liquid preferably "wets" substantially the whole of the surface of the pores of the permeable element. Wetting of the permeable element will depend to a degree on dynamic factors but will be assisted if it is favoured by equilibrium wetting conditions. Thus a fluid having a small interfacial tension with the permeable element will tend to displace from the surface of the pores of the permeable element a fluid having a large interfacial tension with the permeable element, which displacement process is assisted by a small interfacial tension between the two fluids. To improve the "wetting" of the permeable element the surface of the pores of the permeable element are preferably coated with a wetting agent, or a wetting agent is preferably added to at least one of the fluids. For example, where the first fluid is water and the pores of the permeable element have a hydrophobic surface, e.g. the permeable element is a mat of polytetrafluoroethylene fibres, suitable surfactants, e.g. sodium dodecylsulphate or a Monflur surfactant, may be added to the water.

A plurality of permeable elements, each provided with suitable fluid-collecting means, typically a housing, although we do not exclude the possibility that a circumferential channel and associated removal means as hereinbefore described may be employed, may be joined in series. It will be appreciated that suitable pumps where appropriate may be provided in the lines interconnecting adjacent permeable elements. Conveniently the permeable elements are mounted about a common axis. While the fluids may flow co-currently through the series, it is often preferred that counter-current flow operates.

Accordingly the invention further provides apparatus in which mass transfer between two fluid phases may be effected comprising a plurality of permeable elements connected in series and rotatable about a common axis, means to charge the fluids to the series of permeable elements and means to discharge the fluids from the series of permeable elements.

Preferably each of the permeable elements is an annulus and more preferably the axis of each annulus is coincident with the axis of rotation.

The materials and the structure of the permeable element and, where it is employed, of the rotatable member may be chosen with regard to the nature of the mass transfer occurring thereon. For example, where an endothermic reaction occurs in the process according to the present invention the permeable element and/or the rotatable member, where it is employed, may be provided with heating means, e.g. electrical resistance wires; where an exothermic reaction occurs in a process according to the present invention, the permeable element and/or the rotatable member, where it is employed, may be provided with cooling means, e.g. a cooling coil; where a process according to the present invention involves distillation, the permeable element and/or the rotatable member, where it is employed, may be provided with insulating means, e.g. a layer of glass fibre.

The process according to the present invention may be employed in inter alia, absorption, desorption, counter current extraction, distillation, homogenisation processes.

Absorption processes which may be effected by the process according to the present invention may be physical, e.g. absorption of ammonia, nitrogen oxides, or hydrogen chloride in water, or ammonia in brine, or nitrogen oxides in nitric acid; or they may involve a chemical reaction, e.g. absorption of sulphur dioxide in milk of lime to form calcium bisulphite; absorption of oxygen/air mixtures for oxidation of hydrocarbons e.g. cumene, cyclohexane or xylene; absorption of sulphur trioxide for the sulphonation of organic compounds, particularly $C_{10}$–$C_{20}$ α-olefins; absorption of chlorine or bromine for the chlorination and bromination of paraffins and olefins; absorption of chlorine in caustic soda solution for the preparation of hypochlorite.

Desorption processes which may be effected by the process according to the present invention include inter alia removal of a reaction by-product, e.g. ethylene glycol from a polymerising melt of polyethylene terephthalate "monomer"; deodorisation of natural oils and fats, e.g. cotton seed oil, soybean oil, corn oil, lard, by treating the oils or fats with steam; volatilisation of organic material from aqueous solution, e.g. removal of acetone from water by air; and, removal of ammonia and carbon dioxide from brine. Often such desorption processes are effected at reduced pressure, typically the reduced pressure is between 1 mm and 10 mm of mercury.

Extractions which may be effected by the process according to the present invention include inter alia extraction of benzene, toluene and xylene from naphtha using diethylene glycol as extractant; dehydration of aqueous hydrogen fluoride and aqueous hydrogen chloride with oleum; extraction of formic acid and acetic acid from the so-called black liquors of the cellulose industry with methyl ethyl ketone.

Distillations which may be effected by the process according to the present invention include inter alia separation of ethyl benzene from xylene, separation of $C_2$ hydrocarbons (ethylene from ethane), separation of $C_3$ hydrocarbons (propylene from propane), separation of aromatics, separation of mono-, di- and trimethylamines and ethylamines, isopentane separation from light naphtha and propylene oxide/water separation.

Where distillation is effected by the process of the present invention it will be appreciated that liquifying means, e.g. a condenser, is required to liquify the vapour discharged from the permeable element and that vapourising means e.g. a boiler, is required to vaporise a liquid, the vapour of which is to be charged to the permeable element. Preferably a plurality of permeable elements, each with its associated fluid collecting means and preferably supported in a rotatable member, is connected in series about a common axis and the series provided with ancilliary equipment such as liquifying means and vapourising means, to form a distillation apparatus.

Accordingly the present invention further provides a distillation apparatus comprising a plurality of permeable elements, each with its associated fluid collecting means, connected in series and rotatable about a common axis, vapourising means to vaporise a liquid, the vapour of which may be charged to the series of permeable elements and liquifying means to liquify a vapour discharged from the said series.

Where continuous distillation is effected in the distillation apparatus the point at which the liquid feed is fed to the distillation apparatus is determined by the composition of the liquid feed. The said point may be readily determined by a man skilled in the distillation art. The lower and higher boiling fractions of the liquid feed flow from the said point via the permeable elements to opposite ends of the series where they discharge as a vapour and liquid respectively. The vapour is liquified in a liquifier and a proportion of the liquid is collected and a proportion returned to the said series. A proportion of the liquid discharging from the series of permeable elements is collected and a proportion is vapourised in a vapourising means and the vapour produced is returned to the series of permeable elements.

The distillation apparatus of the present invention may be adapted for so-called "vapour recompression", by which we mean compression of a vapour to form a hot liquid and extraction of the heat therefrom in a heat exchanger. The vapour discharging from the series of permeable elements is liquified in a compressor and the hot liquid from the compressor is fed to a heat exchanger. In the heat exchanger the hot liquid loses heat which is absorbed by a proportion of the liquid discharged from the series of permeable elements, which proportion thus requires less heat from the boiler for vapourisation. In this way the overall energy requirements of the distillation apparatus may be reduced. Preferably the compressor is driven by the drive shaft which rotates the series of permeable elements.

The invention will be further described by reference to the accompanying drawings which show, by way of example only, apparatus which may be employed in the process according to the present invention.

Figure 1:
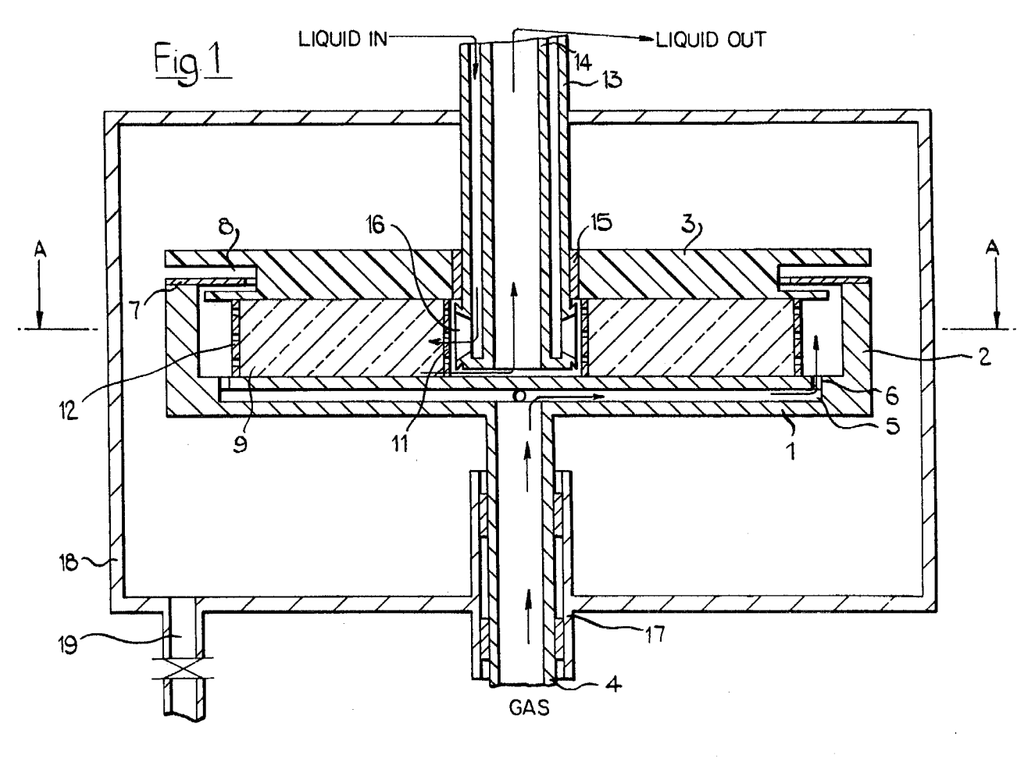
FIG. 1 is a longitudinal cross-section of a gas-absorber.
Figure 2:
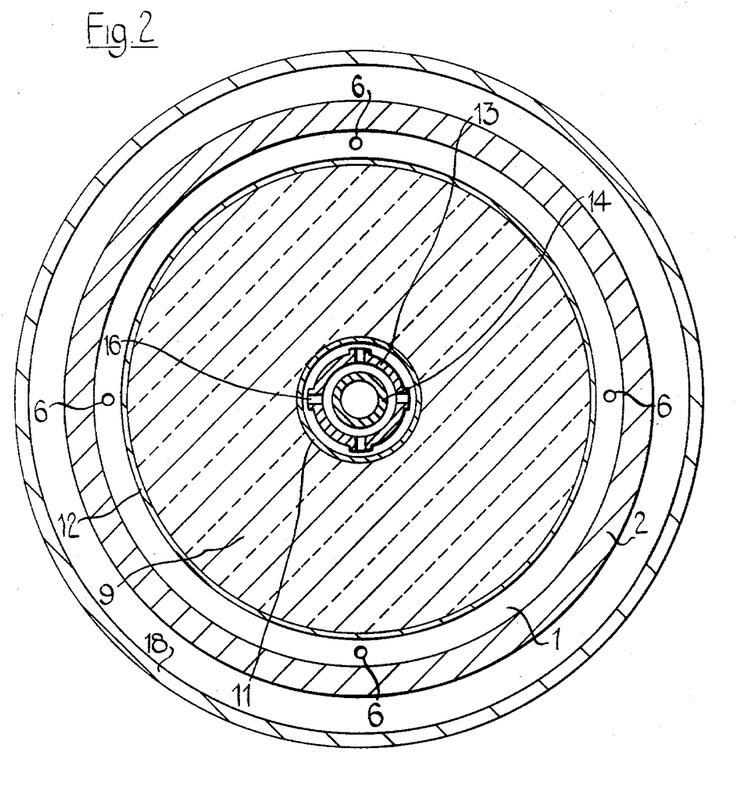
FIG. 2 is a transverse cross-section on a different scale on the line AA of FIG. 1.

In FIGS. 1 and 2 a hollow disc having a stainless steel base 1 and wall 2 and a transparent plastic lid 3 sold under the trademark Perspex bolted to the wall 2 is provided with a hollow shaft 4. The hollow shaft 4 communicates with four radial channels 5 in the base 1 which lead to ports 6 through which a fluid may flow. The wall 2 is provided with a lip 7 which engages with an annular groove 8 in the lid 3. A mass of glass beads, 1 mm in diameter, supported in the hollow disc between the base and the lid by a radially inwardly disposed wire mesh 11 and a radially outwardly disposed wire mesh 12 form an annular permeable element. Two concentric tubes 13 and 14 project through the lid 3 via a gas-tight seal 15. The outer tube 13 communicates with four fan sprays 16 through which a fluid may be fed to the glass beads 9. The hollow shaft 4 is rotatably mounted on roller bearings in a bearing housing 17 which is attached to a stationary housing of stainless steel 18 provided with a port 19. An electric motor (not shown) provides the drive to the hollow shaft in a "vee" belt drive.

In operation, the hollow disc is rotated, a liquid is fed via the tube 13 to the glass beads 9, moves radially outward to fill the space between the wire mesh 12 and the wall 2 and is expelled through the passage defined by the lip 7 and the groove 8. A gas is fed into the apparatus through the hollow shaft 4 and the channels 6 and enters the annular space between the wall 2 and the wire mesh 12. The liquid in the space between the wall 2 and the outer mesh 11 prevents escape of gas at the wall 2 and the gas is forced between the glass beads counter-current to the liquid to escape via the tube 14. The liquid collects in the housing 18 and may be run off through port 19 as desired.

Figure 3:
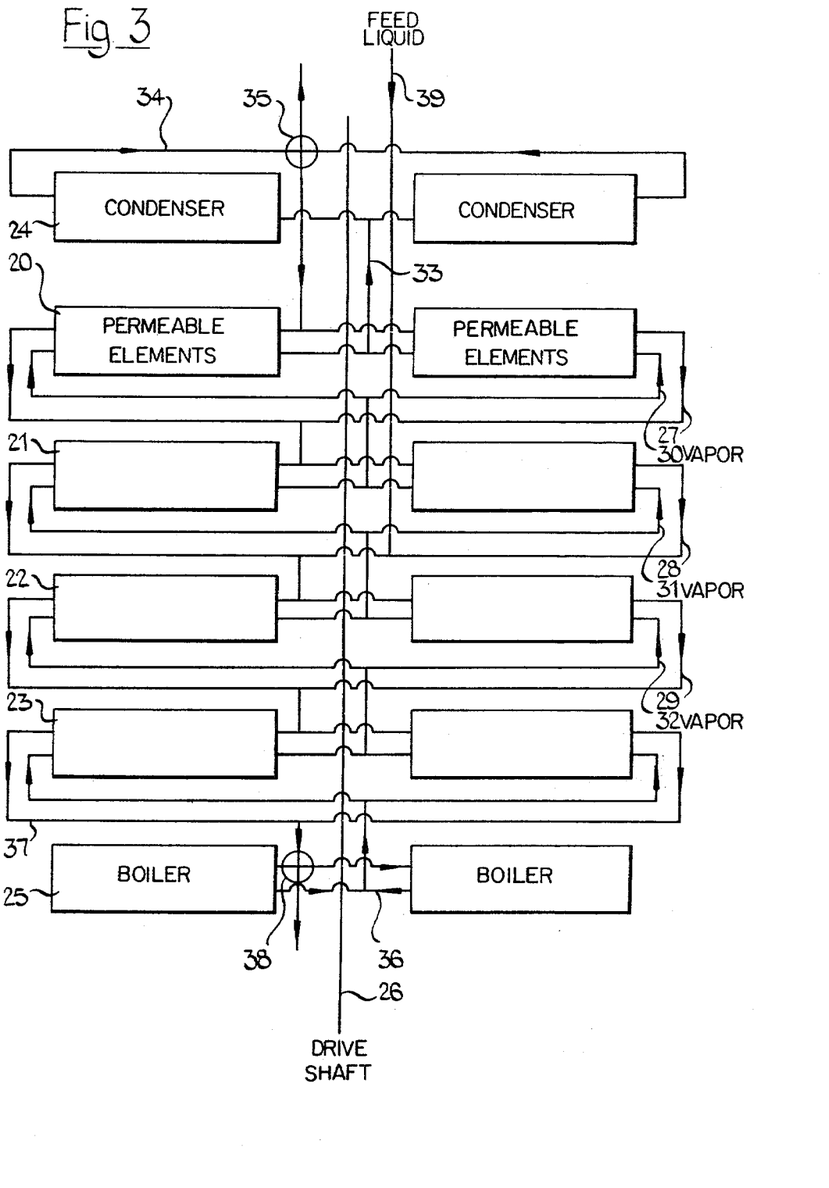
FIG. 3 is a diagrammatic representation of a continuous distillation apparatus according to the invention.

In FIG. 3, stationary housing 20, 21, 22, 23, a condenser 24 and a boiler 25, are mounted about a drive shaft 26. The drive shaft 26 rotates permeable elements supported in rotatable members (not shown) mounted within the housings 20, 21, 22 and 23. Liquid lines 27, 28, 29 and vapour lines 30, 31, 32 provided with suitable pumps (not shown) interconnect adjacent housings. A vapour line 33 and a liquid line 34 fitted with a splitter 35 connect the condenser 24 to the stack of housings. A vapour line 36 and a liquid line 37 fitted with a splitter 38 connect the boiler 25 to the stack of housings. A feed line 39 is attached to the liquid line 28.

In operation the drive shaft 26 is rotated by a motor (not shown). Feed liquid enters the distillation apparatus through feed line 39, mixes with the liquid in line 28 and is forced radially outward through the permeable element in housing 22 while contacting the vapour flowing radially inward through the permeable element in housing 22. A proportion of the lower boiling fraction in the feed liquid is stripped and moves with the vapour through line 31 to the permeable element in housing 21 while the higher boiling fraction moves with the liquid through line 29 to the permeable element in housing 23. The higher boiling fraction discharged from housing 23 flows through line 37, a proportion is run off through the splitter 38 to a storage tank and the remainder is fed to boiler 25. The vapour issuing from boiler 25 passes through line 36 to the permeable element in housing 23. The vapour flows through the permeable elements until the lower boiling fraction is discharged into line 33 and then flows to the condenser 24. The liquid issuing from the condenser passes through line 34, a proportion of it is run off through splitter 35 to a storage tank and the remainder is returned to the stack of housings.

Figure 4:
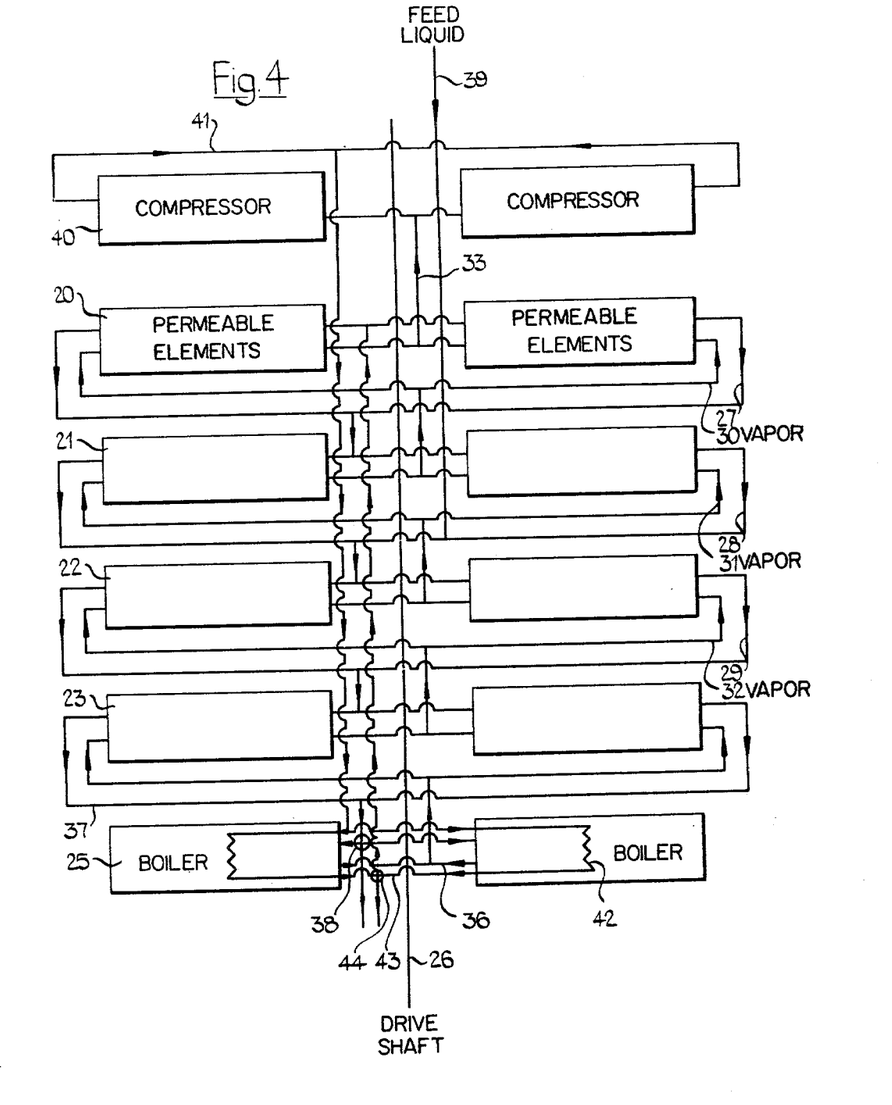
FIG. 4 is a diagrammatic representation of the apparatus shown in FIG. 3 adapted for vapour recompression.

In FIG. 4 a compressor 40 is mounted on the drive shaft 26. A vapour line 33 and a liquid line 41 connect the compressor to the stack of housings and to a heat exchanger 42 respectively. A liquid line 43, fitted with a splitter 44, connects the heat exchanger 42 to the stack of housings.

In operation the lower boiling fraction is discharged from the stack of housings and passes through line 33 to compressor 40 where it is compressed to form a liquid. The liquid passes through line 41 to the heat exchanger 42 where it loses heat which is absorbed by the higher boiling fraction. The cooled liquid from the heat exchanger passes through line 43, a proportion of it is run off through splitter 44 to a storage tank and the remainder is returned to the stack of housings.

EXAMPLE 1

A hollow disc as illustrated in FIGS. 1 and 2 was packed with 1 mm glass beads of interfacial area 3300 m$^{-1}$. The glass beads formed an annular permeable element of internal radius 4 cm and external radius 9 cm. The disc was rotated at 1250 rpm while deoxygenated water at a flow rate of $3 \times 10^{-5}$ m$^3$ sec$^{-1}$ was delivered to the hollow disc to flow radially outwards between the glass beads and air flowed radially inwards. The concentration of oxygen in the water discharging from the disc was measured using a dissolved oxygen probe. The experiment was repeated at a speed of rotation of 1500 rpm. The experiment was repeated a further twice at a flow rate of water of $5 \times 10^{-5}$ m$^3$ sec$^{-1}$ and rotation speeds of 1500 rpm and 1750 rpm. The mass transfer coefficients K$_L$ were calculated using the equation:

$$K_L = \frac{Q}{Va} \ln \frac{C_{e1} - C_1}{C_{e1} - C_2}$$

where $K_L$ = mass transfer coefficient for liquid film controlled mass transfer (m s$^{-1}$),
Q = Volumetric flow rate of water (m$^3$ s$^{-1}$),
V = Volume occupied by the permeable element (m$^3$),
$C_1$ = Concentration of oxygen in the charging water,
$C_2$ = Concentration of oxygen in the discharging water,
$C_{e1}$ = Equilibrium concentration of oxygen in water at ambient temperature,
a = Interfacial area of permeable element (m$^{-1}$) and the so-called "volumetric mass transfer coefficients" were calculated using the equation:
Volumetric mass transfer coefficient = K$_L$a(s$^{-1}$).

For comparison, the mass transfer and the volumetric mass transfer coefficients of oxygen/water on a stationary column of ½" Intalox Saddles (trademark), 625 m$^{-1}$ interfacial area, were determined at the water flow rates employed in the rotational experiments.

The results are given in Table I from which it can be seen that increasing the rotational speed of a permeable element at any particular liquid flow rate increases the mass transfer coefficient K$_L$, and that rotating the permeable element and increasing its interfacial area increases the mass transfer per unit volume as defined by K$_L$a/(K$_L$a)$_I$

TABLE I

| Mass Transfer Coefficients of a Water/Oxygen System on 1 mm Glass Beads | | | | |
|---|---|---|---|---|
| Water flow rate m$^3$s$^{-1}$ × 10$^5$ | Rotational speed rpm | Mean Accltn "a$_m$" | Mass Transfer Co-efficient K$_L$ ms$^{-1}$ × 10$^5$ | K$_L$a/(K$_L$a)$_I$ |
| 3 | 1250 | 1197 | 21.2 | 37 |
| 3 | 1500 | 1727 | 24.9 | 42 |
| 5 | 1500 | 1727 | 20.3 | 41 |
| 5 | 1750 | 2354 | 21.7 | 44 | where (K$_L$a)$_i$ is the volumetric mass transfer coefficient of oxygen/water on a stationary column of ½" Intalox Saddles.

EXAMPLE 2

A hollow steel disc was packed with 12 filament copper gauze said under the trademark Knitmesh 9031 having an interfacial area of 1650 m$^{-1}$. The gauze formed an annular permeable element of internal radius 4 cm and external radius 9 cm. The disc was rotated at 1500 rpm while deoxygenated water at $4 \times 10^{-5}$ m$^3$ sec$^{-1}$ flowed radially outward through the copper gauze and air flowed radially inwards. The concentration of oxygen in the water discharging from the disc was measured as in Example 1. The experiment was repeated a further twice at a flow rate of water of $6 \times 10^{-5}$ m$^3$ sec$^{-1}$ and rotational speeds of 1500 rpm and 1750 rpm. The mass transfer coefficents and the increase in mass transfer per unit volume, which were calculated as in Example 1, are given in Table 2.

TABLE 2

| Mass Transfer Coefficients of a Water/Oxygen System on Knitmesh Copper Gauze | | | | |
|---|---|---|---|---|
| Water flow rate m$^3$s$^{-1}$ × 10$^5$ | Rotational speed rpm | Mean Accltn "a$_m$" | Mass Transfer Co-efficient K$_L$ ms$^{-1}$ × 10$^5$ | K$_L$a/(K$_L$a)$_I$ |
| 4 | 1500 | 1727 | 19.4 | 27 |
| 4 | 1750 | 2354 | 20.6 | 28 |
| 6 | 1500 | 1727 | 26.7 | 29 |
| 6 | 1750 | 2354 | 31.5 | 34 |

EXAMPLE 3

Example 1 was repeated except that while water was charged to the hollow disc to flow radially outwards an ammonia (5% v/v)/air mixture was charged to the hollow disc to flow radially inwards. In a first set of experiments the permeable element was an annulus of 1.5 mm glass beads of interfacial area 2400 m$^{-1}$ and in a second set of experiments the permeable element was an annulus of Knitmesh 9031 (trademark) Stainless steel gauze of interfacial area 1650 m$^{-1}$. The mass transfer coefficients were calculated using the equation:

$$K_G = \frac{M_w Q (C_2 - C_1)}{V a P_T} \left\{ \frac{\ln\left(\frac{y_1 - y_{e1}}{y_2 - y_{e2}}\right)}{(y_1 - y_{e1}) - (y_2 - y_{e2})} \right\}$$

where $K_G$ = mass transfer coefficient for gas film controlled mass transfer, $M_w$ = molecular weight of ammonia in kilogrammes $Q$ = volumetric flow of water (liter sec$^{-1}$), $C_2$ = Ammonia concentration in discharging liquid (moles 1$^{-1}$), $C_1$ = Ammonia concentration in charging liquid (moles 1$^{-1}$), $V$ = volume occupied by the permeable element (m$^3$), $a$ = Interfacial area of permeable element (m$^{-1}$), $P_T$ = Total pressure in the system (Nm$^{-2}$), $Y_1$ = mole fraction of ammonia in the charging gas, $Y_{e1}$ = mole fraction of ammonia in the gas phase in equilibrium with an ammonia/water solution of concentration $C_1$, $Y_2$ = mole fraction of ammonia in the discharging gas, $Y_{e2}$ = mole fraction of ammonia in the gas phase in equilibrium with an ammonia water solution of concentration $C_2$, For comparison, the mass transfer and volumetric mass transfer coefficients of ammonia/water on a stationary column of ½" Intalox Saddles, 625 m$^{-1}$ interfacial area, was determined. The results are given in Table 3 from which it can be seen that increasing the rotational speed of a permeable element at a particular liquid flow rate increases the mass transfer coefficient $K_G$ for gas film controlled mass transfer and that rotating the permeable element and employing a permeable element of greater interfacial area increases the mass transfer per unit volume as defined by $K_Ga/(K_Ga)_1$ where $(K_Ga)$ is the volumetric mass transfer coefficient of ammonia/water on a stationary column of Intalox Saddles.

EXAMPLE 4

A hollow stainless steel disc was packed with Knitmesh 9031 12 filament stainless steel gauze having an interfacial area of 1650 m$^{-1}$. The gauze formed a permeable element having an internal radius of 6 cm and an external radius of 9 cm. A boiler and a condenser are connected to the apparatus such that a vapour may be charged to the outer perimeter of the permeable element and a liquid may be charged to the inner perimeter of the permeable element respectively. Distillation of a methanol/ethanol mixture was carried out at "Total Reflux" (i.e. all the condensed vapour being returned to the permeable element). A mixture of 70 mole % methanol and 30 mole % ethanol was charged to the boiler and a vapour of methanol and ethanol produced on heating. The disc and the permeable element were rotated at 1600 rpm and the vapour moved radially inwards through the permeable element, and to the condenser where the vapour liquified and the liquid so-formed was recharged to the permeable element by spraying uniformly across the inner perimeter of the permeable element. The liquid moved radially outwards under the influence of acceleration effecting counter current flow. When the apparatus was operating at steady state, samples of liquid from the condenser and boiler were taken and the mole fraction of more volatile component found using a refractometer. The composition of the liquid in the boiler was 30 mole % ethanol 70 mole % methanol and the composition of the liquid condensed in the condenser after passing through the permeable element was found to be 9 mole % ethanol and 91 mole % methanol.

The number of transfer units was calculated using the "McCabe and Thiele" method as described in "Chemical Engineering, Volume 2, Second Edition" pp 331–332 by J M Coulson and J F Richardson published by Pergamon Press, Oxford 1968 and the equilibrium data published by I P Slobodyanik and E M Babushkina in Journal of Applied Chemistry of USSR, 1966, Vol 39, pp 1782–1783. The mass transfer coefficient $K_G$ was then calculated using the equation:

$$K_G = \frac{\text{Vapour flow rate}}{\text{Interfacial area}} \times \text{height of Transfer unit}$$

where Height of transfer unit = $\frac{\text{Radial depth of permeable element}}{\text{No of transfer units}}$ For comparison distillation of a 30 mole % ethanol and 70 mole % methanol mixture was carried out on conventional tower with ½" Intalox Saddles. The results are given in Table 4 from which it can be seen that

TABLE 3

Mass Transfer Coefficients for Gas Film Controlled Mass Transfer

| Permeable Element | Rotation Speed rpm | Mean Acceleration m sec$^{-2}$ | Mass Transfer Coeff $K_G$m$^{-1}$ sec × 10$^8$ | $\frac{K_Ga}{(K_Ga)_1}$ |
|---|---|---|---|---|
| Glass Beads | 1000 | 760 | 3.94 | 4 |
| Glass Beads | 1750 | 2354 | 4.83 | 5 |
| Stainless Steel Gauze | 1000 | 760 | 10.80 | 8 |
| Stainless Steel Gauze | 1750 | 2354 | 12.69 | 9 |

Interfacial area of glass beads 2400 m$^{-1}$
Interfacial area of stainless steel gauze 1650 m$^{-1}$
Liquid flow rate 1.7 × 10$^{-5}$ m$^3$ sec$^{-1}$
Gas Flow rate 0.88 × 10$^{-3}$ m$^3$ sec$^{-1}$
$(K_Ga)_1$ = 2.35 × 10$^{-5}$ m$^{-2}$ sec increasing the acceleration increases the mass transfer coefficient.

TABLE 4

| Mass Transfer Coefficients for Ethanol/Methanol | | | |
|---|---|---|---|
| Vapour flow rate mols m$^{-2}$ sec$^{-1}$ × 10$^3$ | Mean acceltn m sec$^{-2}$ | Mean Transfer Coeff $K_G$ mols m$^{-2}$ sec$^{-1}$ × 10$^5$ | Vol Mass Transfer Coeff $K_Ga$ mols m$^{-3}$ sec$^{-1}$ |
| 8.6 | 2147 | 44 | 0.72 |
| 8.42 | 9.8 | 5.4 | 0.034 |

We claim:

1. A process for effecting mass transfer between two fluid phases, the first of which is a liquid, which process comprises the steps of:
   (a) charging the said fluids to an element which has an interfacial area of more than 1500 m$^{-1}$, is permeable to the fluids and has pores which present a tortuous path to the fluids,
   (b) rotating the said element about an axis such that the fluids flow through the said pores with the first fluid flowing radially outwards away from the said axis, and
   (c) collecting at least a proportion of one of the fluids discharged from the said element.

2. A process for effecting mass transfer according to claim 1 in which the permeable element is disposed in a member which is rotatable about the said axis.

3. A process for effecting mass transfer according to claim 1 in which the permeable element has an axis of symmetry which is coincident with the axis of rotation.

4. A process for effecting mass transfer according to claim 3 in which the fluids are passed through a plurality of permeable elements which are disposed along a common axis and are connected in series.

5. A process for effecting mass transfer according to claim 1 in which counter current flow of the fluids occurs.

6. A process for effecting mass transfer according to claim 1 in which at least a proportion of the first fluid is collected in a stationary collecting means in which the permeable element is disposed.

7. Apparatus in which mass transfer between two fluid phases may be effected comprising a plurality of permeable elements each mounted in series along a common axis, said elements in series fluid flow communication one to the other and rotatable about the said common axis, means to charge the fluids to the series of permeable elements and means to discharge the fluids from the said series, ech of the said elements being permeable to the fluids and having an interfacial area of more than 1500 m$^{-1}$ and pores which present a tortuous path to the fluids.

8. Distillation apparatus comprising a plurality of permeable elements, each with a fluid collecting means, mounted in series along a common axis, said elements in series fluid flow communication one to the other and rotatable about the said common axis, vapourising means to varporise a liquid the vapour of which may be charged to the series of permeable elements and liquifying means to liquify a vapour discharged from the said series, each of the said elements being permeable to the fluids and having an interfacial area of more than 1500 m$^{-1}$ and pores which present a tortuous path to the fluids.

9. Distillation apparatus as claimed in claim 8 wherein means to feed a liquid feed to the apparatus is provided intermediate the ends of the series.

10. Distillation apparatus as claimed in claim 8 or 9 wherein the vapourising means and the liquifying means are rotatably mounted about the common axis.

11. Distillation apparatus as claimed in claim 8 wherein the liquifying means is a condenser.

12. Distillation apparatus as claimed in claim 8 wherein the liquifying means is a compressor.

13. Distillation apparatus as claimed in claim 12 wherein a heat exchanger is connected to the compressor and to the heating means, the apparatus being adapted and arranged such that liquid from the compressor loses heat in the heat exchanger to the liquid which is to be vapourised in the vapourising means.

* * * * *